United States Patent
Longobardi et al.

(10) Patent No.: US 8,250,366 B2
(45) Date of Patent: Aug. 21, 2012

(54) METHOD AND SYSTEM FOR ELECTRONIC VEHICLE DOCUMENT DISPLAY

(75) Inventors: Giuseppe Longobardi, Castellammare di Stabia (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 12/207,401

(22) Filed: Sep. 9, 2008

(65) Prior Publication Data

US 2010/0064136 A1    Mar. 11, 2010

(51) Int. Cl.
*H04L 9/00* (2006.01)
(52) U.S. Cl. ............... 713/168; 713/156; 713/157
(58) Field of Classification Search ............ 713/168, 713/155, 175, 176, 180
See application file for complete search history.

(56) References Cited

U.S. PATENT DOCUMENTS

| | | | |
|---|---|---|---|
| 4,804,254 A | 2/1989 | Doll et al. | |
| 5,105,179 A | 4/1992 | Smith | |
| 6,052,068 A * | 4/2000 | Price R-W et al. ........... | 340/933 |
| 6,404,327 B1 | 6/2002 | Naddeo | |
| 6,618,668 B1 * | 9/2003 | Laird ........................... | 701/204 |
| 6,690,268 B2 | 2/2004 | Schofield et al. | |
| 6,812,851 B1 | 11/2004 | Dukach et al. | |
| 6,888,445 B2 | 5/2005 | Gotfried et al. | |
| 6,916,099 B2 | 7/2005 | Su et al. | |
| 7,161,563 B2 | 1/2007 | Vitale et al. | |
| 7,308,341 B2 * | 12/2007 | Schofield et al. ............. | 701/1 |
| 7,518,488 B2 * | 4/2009 | Dong et al. ............... | 340/426.1 |
| 2002/0113876 A1 * | 8/2002 | Kim ............................ | 348/148 |
| 2003/0068999 A1 * | 4/2003 | Casali et al. .................. | 455/345 |
| 2005/0200696 A1 * | 9/2005 | Schedivy ....................... | 348/61 |
| 2005/0267676 A1 * | 12/2005 | Nezu et al. .................... | 701/200 |
| 2007/0151133 A1 | 7/2007 | Hunsaker | |
| 2007/0192590 A1 * | 8/2007 | Pomerantz et al. ........... | 713/157 |
| 2010/0049528 A1 * | 2/2010 | Zeinstra et al. ............... | 704/275 |

FOREIGN PATENT DOCUMENTS

WO    WO 01/50435 A1    7/2001

* cited by examiner

*Primary Examiner* — Haresh N Patel
*Assistant Examiner* — Mohammad Siddiqi
(74) *Attorney, Agent, or Firm* — DeLizio Gilliam, PLLC

(57) ABSTRACT

A method and system for automatically displaying electronic documents on a vehicle display screen, is provided. One implementation involves transferring an encrypted digital certificate to a control module in a vehicle, the vehicle including a display screen embedded in a window area of the vehicle, wherein the control module is configured for connection to the display screen; storing the digital certificate in a memory unit of the control module; automatically displaying information on the display screen by: retrieving the digital certificate from the memory unit of the control module; and upon validating the digital certificate in the control module, displaying said information associated with the digital certificate on the display screen.

18 Claims, 5 Drawing Sheets

METHOD AND SYSTEM FOR ELECTRONIC VEHICLE DOCUMENT DISPLAY

BACKGROUND OF THE INVENTION

1. Field of the Invention

The present invention relates generally to document display and in particular to electronic document display.

2. Background Information

In many countries it is necessary to display certain documents related to a vehicle in a fashion visible to someone outside the vehicle, in order to demonstrate compliance with certain requirements (e.g., compliance to the local laws, vehicle is covered by a valid insurance contract, or that the owner has paid road taxes). Such documents typically comprise square pieces of paper inserted into a transparent plastic pouch that is attached to the inside surface of the vehicle windshield.

One shortcoming with this method of displaying compliance is the potential for breaking into the vehicle and theft of the document for tampering and resale, and the collateral damage to the vehicle in perpetrating the theft. Another shortcoming is that the ink on a paper document can fade over time, especially due to extensive exposure to sunlight. In many instances the fade is severe to the extent that the writing on the document is no longer legible, and therefore no longer serves the purpose of demonstrating compliance.

SUMMARY OF THE INVENTION

The invention provides a method and system for automatically displaying electronic documents on a vehicle display screen. One embodiment includes transferring an encrypted digital certificate to a control module in a vehicle, the vehicle including a display screen embedded in a window area of the vehicle, wherein the control module is configured for connection to the display screen; storing the digital certificate in a memory unit of the control module; automatically displaying information on the display screen by: retrieving the digital certificate from the memory unit of the control module; and upon validating the digital certificate in the control module, displaying said information associated with the digital certificate on the display screen.

The process may further include electronically receiving an encrypted digital certificate using a receiving device. Transferring the encrypted digital certificate to the control module may further include coupling the receiving device to the control module via an I/O port of the control module for electronically transferring the digital certificate to the memory unit of the control module. Coupling the receiving device to the control module may further include wirelessly coupling the receiving device to the control module.

Displaying information associated with the digital certificate may include validating the digital certificate using a validation function of the control module. Transferring an encrypted digital certificate to the control module may further include transferring associated information to the control module, and displaying information associated with the digital certificate on the display screen may further include retrieving the digital certificate from the memory unit of the control module; and upon validating the digital certificate in the control module, displaying said associated information on the display screen.

The control module may include multiple processing functions, such that displaying information on the display screen further includes displaying information processed by one or more of said processing functions of the control module.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for automatically displaying electronic vehicle documents. One embodiment involves automatically displaying vehicle documents, including electronically receiving an encrypted digital certificate, importing said encrypted digital certificate into a control module comprising an import port, the control module automatically storing the digital certificate and analyzing its validity, and if the certificate is valid, then the control module displaying on a display screen attached to the vehicle window (such as the windshield), the vehicle documents which are stored by the control module, such that the electronic documents are visible to a viewer outside the vehicle. Preferably the display screen is embedded within the vehicle window to prevent tampering with the display screen. The display screen may further be utilized to displaying other information.

Figure 1:
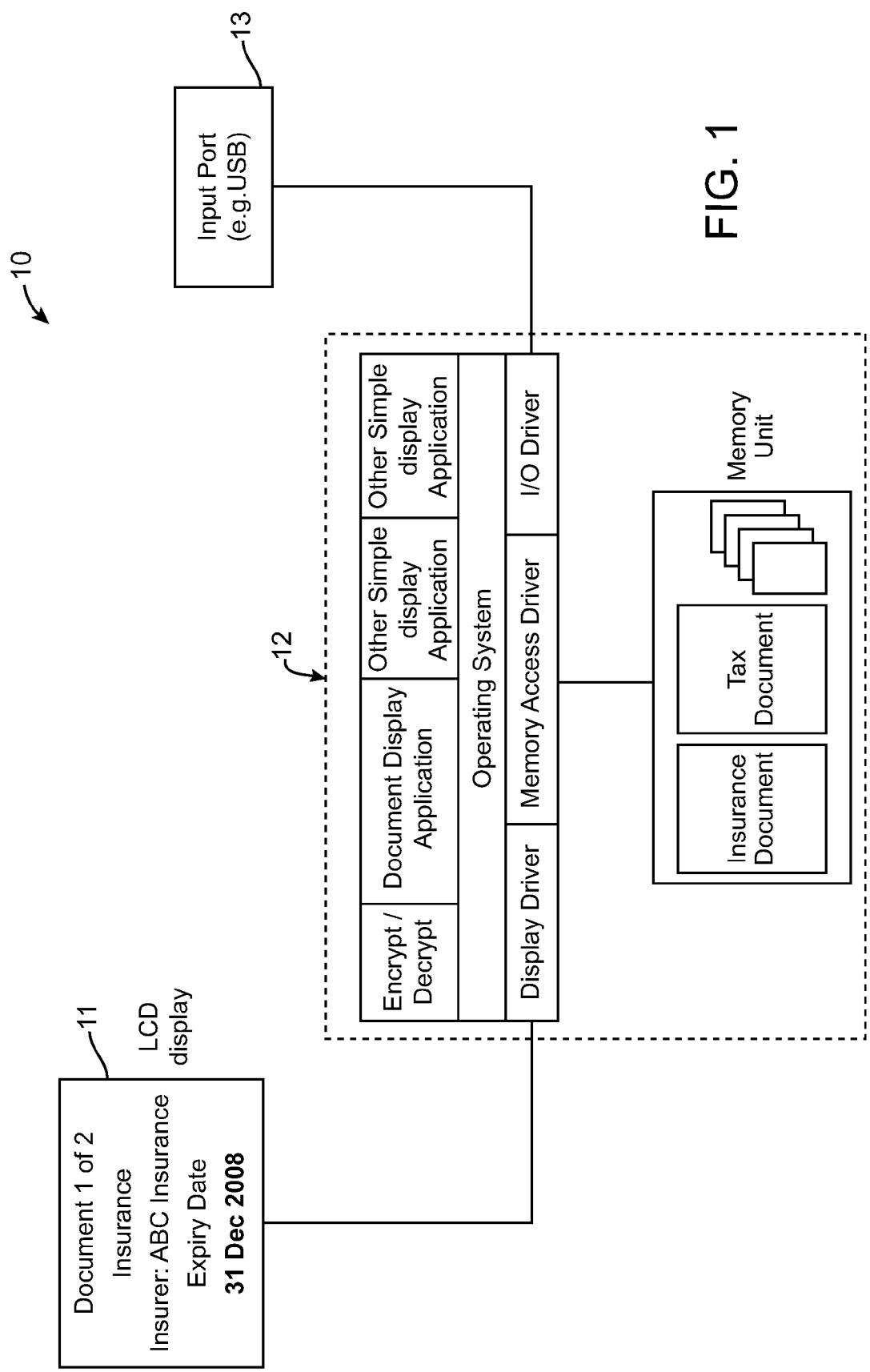
FIG. 1 shows a functional block diagram of a system for automatically displaying electronic vehicle documents, according to a preferred embodiment of the invention.

FIG. 1 shows a functional block diagram of a system 10 for automatically displaying electronic vehicle document, according to a preferred embodiment of the invention. The system 10 includes a display screen (e.g., LCD screen) 11 embedded in a vehicle window in a manner visible from at least outside the vehicle (not shown). A control module 12 is configured for electronically receiving an encrypted digital certificate, storing the digital certificate and analyzing its validity by running a validation process therein, and if the certificate is valid, then displaying the vehicle documents on the display screen. The vehicle documents may be pre-stored in the control module 12, or downloaded thereto for display upon validation of the corresponding digital certificates.

Figure 5:
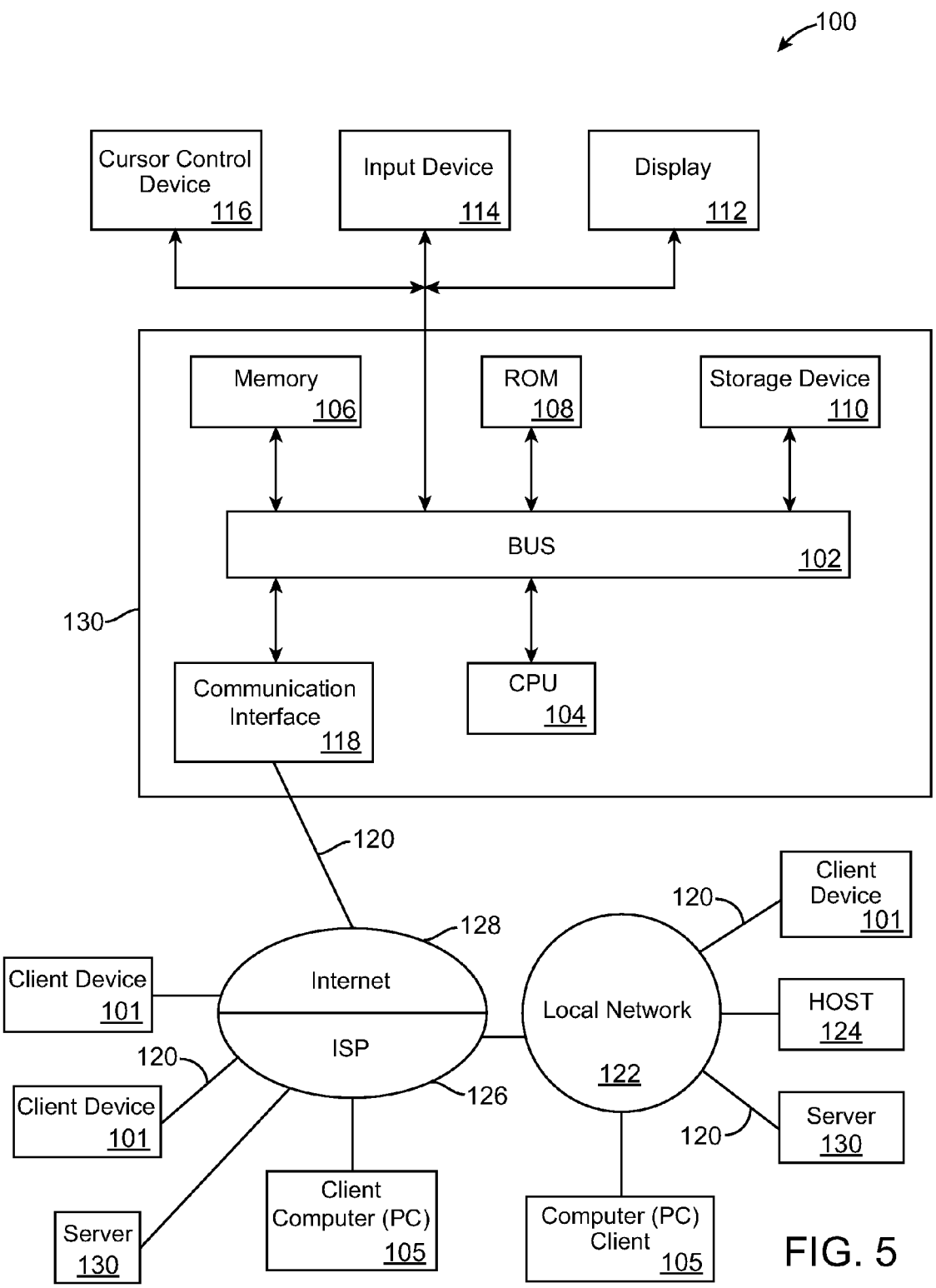
FIG. 5 shows a functional block diagram of an example computing system in which the invention is implemented.

In one embodiment, the electronic control module 12 includes a processor for executing an operating system that allows running applications such as encryption/decryption applications, vehicle document display applications, and other applications. The control module further includes a display driver for the display 11, a memory access driver for a memory unit, and an I/O driver for input/output operations for the control module via an I/O port 13 (e.g., wired port such as USB port, or a wireless port such as WiFi or BlueTooth). The memory unit may store said electronic vehicle documents, digital certificates, applications, and other information as needed. A detailed example of another embodiment of the control module is shown in FIG. 5 and described further below.

In one example scenario, a user of the system receives an encrypted digital certificate electronically using an external device such as a consumer electronics device (e.g., laptop, USB memory key, memory card, RFID), and imports the encrypted digital certificate into the system by attaching the external device to the I/O port of the control module. In a validation process using the encryption/decryption applications, the system verifies the encrypted digital certificate, and upon verification displays the certificate (along with any associated documents) on all or part of the display screen. If more than one certificate is present (e.g., insurance and tax), then upon verification of each certificate, the system may either display them side-by-side on the screen, or use the entire screen area for each and scroll through them in a slideshow mode. The display screen may have buttons to control and select the display mode (e.g., skip, scroll, freeze, show all, sequence, power saving, etc.). The LCD display may be transparent (i.e., without a dark bottom) to reduce the impact on the visibility of papers that may be placed under the display (e.g., on the dashboard of the vehicle). Moreover the screen will help to reduce the area covered by all the paper certificates and cardboard disk.

Figure 2:
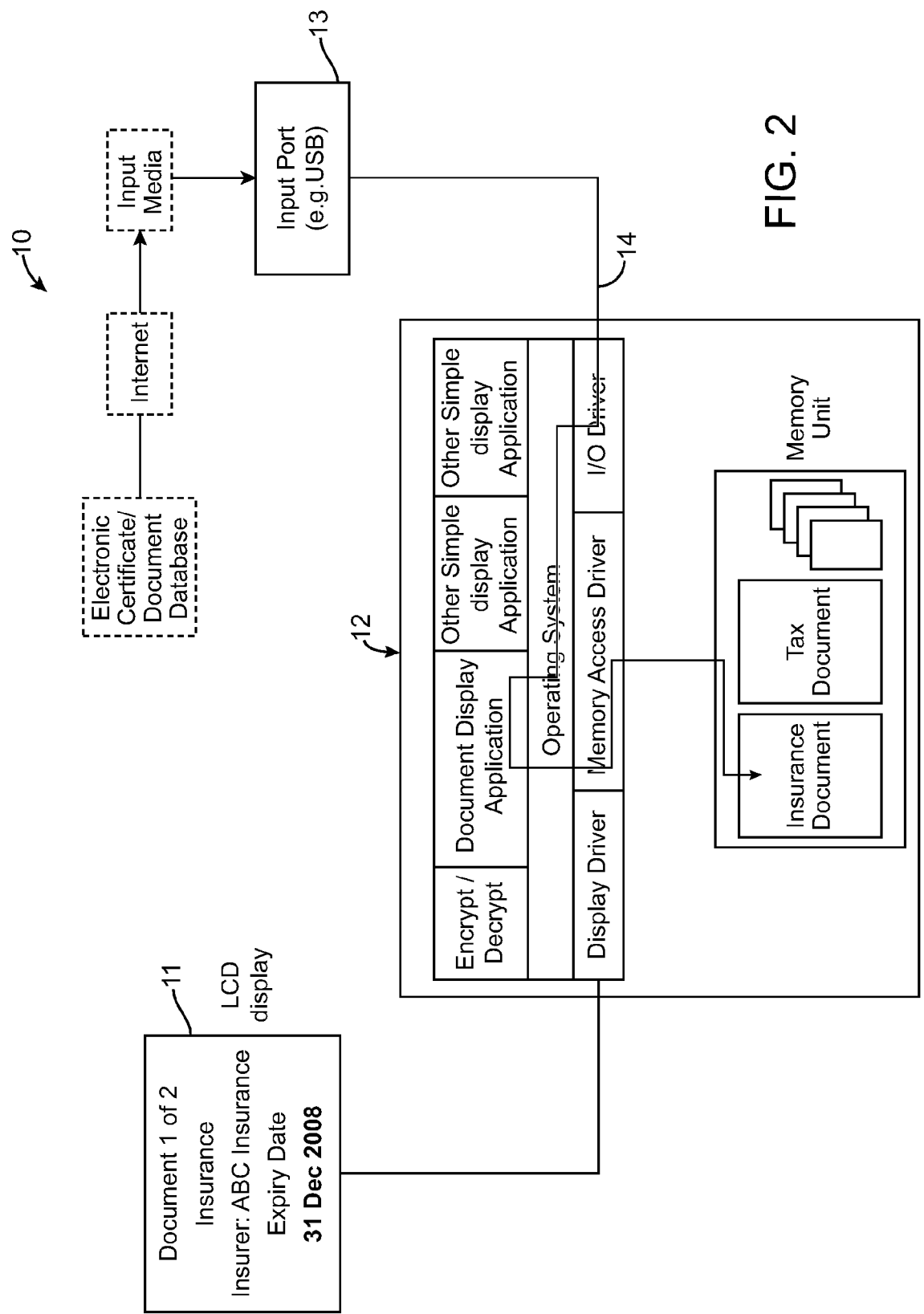
FIG. 2 shows a process flow for storing electronic vehicle documents in the system, according to a preferred embodiment of the invention.

FIG. 2 shows an example process flow 14 in the system where a document is loaded into the control module 12. When input media (e.g., laptop, USB memory key, memory card, RFID) is coupled to the port 13, as guided by the document display application utilizing the operating system, the documents included in the input media (e.g., identified by their file extension) are loaded into the system through the I/O drivers of the control module and are placed in the memory unit via the memory access drivers. The documents/certificates may be securely received by the input media via, e.g., the Internet from a secure electronic database for such documents.

Figure 3:
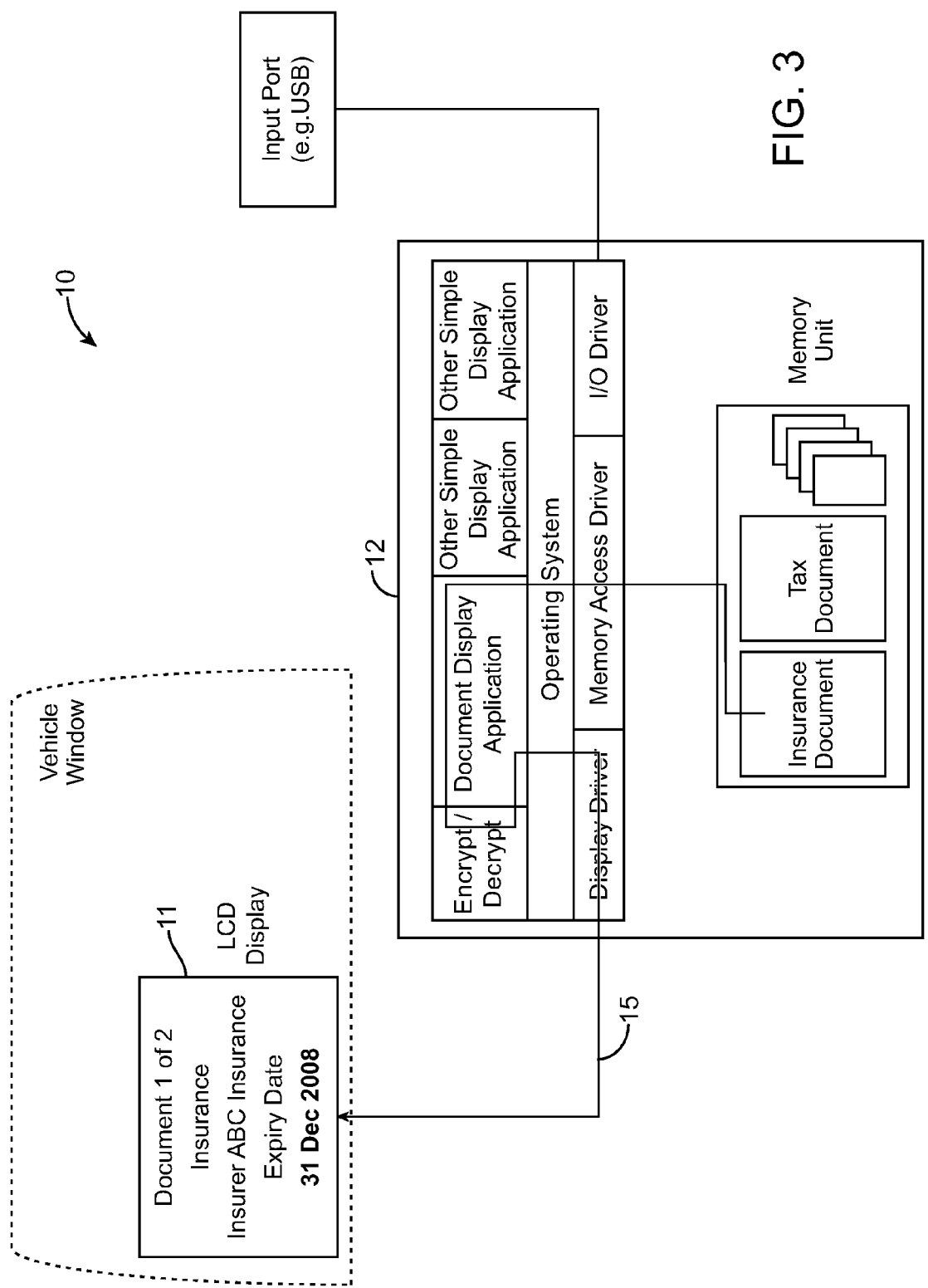
FIG. 3 shows a process flow for retrieving and displaying electronic vehicle documents, according to a preferred embodiment of the invention.

FIG. 3 shows an example process flow 15 in the system where a document is displayed by the control module 12. The document display application recognizes appropriate documents from the memory unit of the control module (e.g., by file extension) and retrieves them through the memory access driver. The documents are decrypted by a call to the appropriate decryption routines in the protected encrypt/decrypt module and are displayed on the display screen by the display drivers. As will be recognized by those skilled in the art, there can be other and/or additional process flows and process flows for optional use cases (e.g., for the other display applications).

Figure 4:
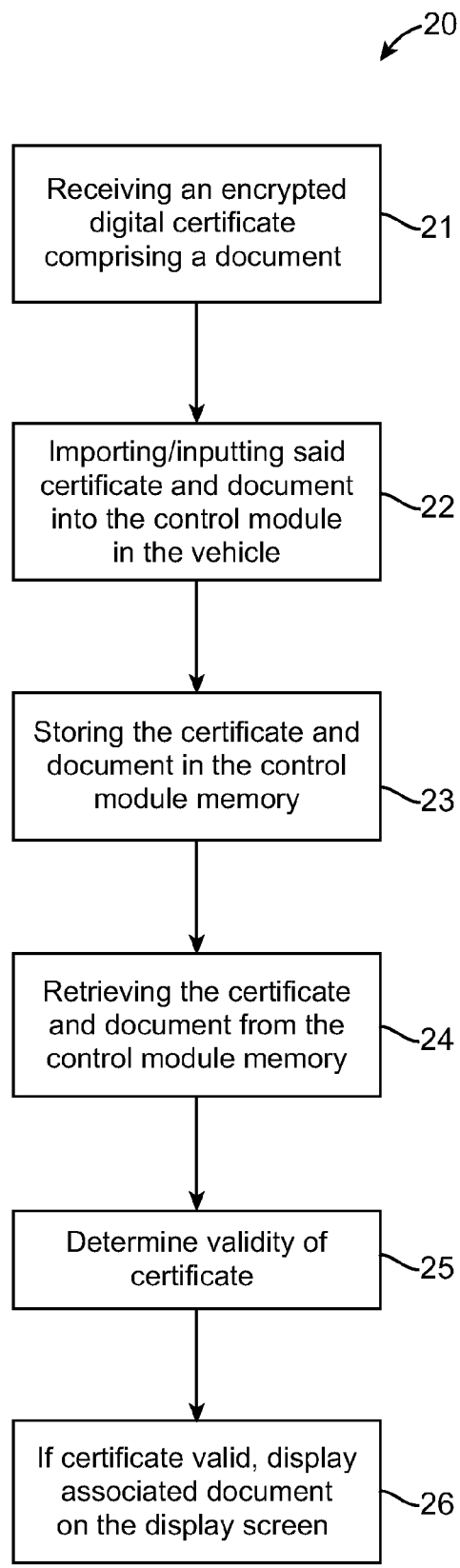
FIG. 4 shows a flowchart of a process for automatically displaying electronic vehicle documents, according to a preferred embodiment of the invention.

FIG. 4 shows a flowchart of the steps of a process 20 for automatically displaying electronic vehicle document, according to a preferred embodiment of the invention. Process block 21 involves receiving an encrypted digital certificate comprising a document on an external device (e.g., said input media) of a user. Process block 22 involves importing/inputting said encrypted digital certificate and document into the control module in the vehicle. Process block 23 involves storing the encrypted digital certificate and document in the control module memory. To display the document associated with the encrypted digital certificate, process block 24 involves retrieving said certificate and document from control module memory. Process block 25 involves decrypting the certificate and analyzing its validity. In process block 26, if the certificate is valid, the associated document is displayed on the display screen.

Preferably, an encrypted certificate is made only for a specific vehicle plate number associated to the display screen, making it more difficult to forge or reuse the system on different cars. A user may receive an email with attached insurance payment records to be loaded into the control module for display on the display screen, or a user may obtain as code to download his certificate from a web site. If paying on-line, proof of user insurance may be provided via the Internet in the form of an original electronic certificate that can be downloaded to the control module of the vehicle involved.

In another embodiment, the system 10 may be configured such that the control module 12 includes other applications (e.g., software programs) such as displaying the time of arrival at a parking space (when period of parking is limited), or to display parking credits (pre-paid parking), rather than have a paper receipt printed from a parking machine. Parking lot equipment may establish a wireless connection with the display screen (directly or through the control module), and may signal to the display the time of parking expiration (to identify the vehicle, an identification code may be used as input when paying, so that only the display screen with that code will recognize that the message is for it). Additionally, a countdown process may be used, and upon completion of the countdown (or when no payment has been made), warning information (e.g., red X or a picture) may be displayed on the display screen to identify unpaid vehicles. The same result may be obtained with a radio-frequency identification (ID) device included in the parking ticket and read by a display device control equipment. The same logic may be used to signal the expiration of other payments for a vehicle (e.g., insurance, taxes, etc.), such that upon expiration, indicative information may be displayed such that the user is made aware of this expiration. This also simplifies identification of a violating vehicle by authorities. The control module may include further functions, showing automatically the proper information according to the place (using GPS for example) where it is running or according to the time when it is running (traffic information). For example, if running in a traffic-limited zone, the control module may show the authorization document needed for doing so. Or if running in a day of traffic stops, it may show the information that the car is "electric" or that it is using "GPL", or that it has a special authorization to go.

In one example, the control module may be stored in the vehicle in a glove compartment and powered by vehicle power system or have a power system of its own such as a battery. The control module then may be connected to the display screen via cables that run to the vehicle windshield, also to the I/O port.

In another embodiment, the input media (FIG. 2) may be a component of the control module, wherein the control module received said certificates/documents directly without the need for coupling an input media to the I/O port. In such a case, the control module may include a function (e.g., a wired or a wireless client module) for receiving certificates/documents directly from a source such as a server (e.g., receiving certificates/documents from Internet via a web connected router in a local area network).

FIG. 5 shows a block diagram of an example architecture of an embodiment of a system 100 configured as above, according to an embodiment of the invention. The system includes one or more client devices 101 connected to one or more server computing systems 130. A server 130 includes a bus or other communication mechanism for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112.

According to one embodiment of the invention, the functions of the system 10 (FIG. 1) are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120.

For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of automatically displaying electronic documents on a vehicle display screen, comprising:
   transferring an encrypted digital certificate to a control module in a vehicle, the vehicle including a display screen embedded in a window of the vehicle in a manner visible from outside the vehicle, wherein the control module is coupled to the display screen, wherein the encrypted digital certificate is for a vehicle plate number for the vehicle and for the display screen;
   storing the digital certificate in a memory unit of the control module; and
   automatically displaying information on the display screen by:
      retrieving the digital certificate from the memory unit of the control module; and
      upon validating the digital certificate in the control module, displaying said information associated with the digital certificate on the display screen, wherein the information includes an electronic document that indicates at least one of compliance with a local law, valid insurance, validation of payment of taxes associated with the vehicle, and a parking receipt for parking the vehicle, wherein the display screen comprises at least one button, manipulable by a user outside of said vehicle, to select a display mode of said display screen.

2. The method of claim 1 further including electronically receiving an encrypted digital certificate using a receiving device.

3. The method of claim 2, wherein transferring the encrypted digital certificate to the control module includes coupling the receiving device to the control module via an I/O port of the control module for electronically transferring the digital certificate to the memory unit of the control module.

4. The method of claim 3, wherein coupling the receiving device to the control module includes wirelessly coupling the receiving device to the control module.

5. The method of claim 1, wherein displaying information associated with the digital certificate includes validating the digital certificate using a validation function of the control module.

6. The method of claim 1, wherein:
   transferring an encrypted digital certificate to a control module further includes transferring said information associated with the digital certificate to the control module; and
   displaying information associated with the digital certificate on the display screen further includes:
      identifying a location of said vehicle utilizing global positioning signal data; and
      displaying said information associated with the digital certificate on the display screen based, at least in part, on said location of said vehicle.

7. The method of claim 1, wherein the control module includes multiple processing functions, such that displaying information on the display screen further includes displaying information processed by one or more of said processing functions of the control module.

8. An apparatus for automatically displaying electronic documents, comprising:
   a display screen embedded in a window of a vehicle, wherein said display screen is visible from outside the vehicle, wherein the display screen comprises at least one button, manipulable by a user outside of said vehicle, to select a display mode of said display screen;
   a control module configured for displaying information on said display screen;
   an I/O port configured for transferring an encrypted digital certificate to the control module, wherein the encrypted digital certificate is for a vehicle plate number for the vehicle and for the display screen;

wherein the control module is coupled to the display screen;

the control module including:
- a memory module configured for storing the digital certificate; and
- a display function configured for automatically displaying information on the display screen by:
  - retrieving the digital certificate from the memory unit of the control module; and
  - upon validating the digital certificate in the control module, displaying information associated with the digital certificate on the display screen, wherein the information includes an electronic document that indicates at least one of compliance with a local law, valid insurance, validation of payment of taxes associated with the vehicle, and a parking receipt for parking the vehicle.

9. The apparatus of claim 8, wherein the control module further includes a validation function configured for validating the digital certificate.

10. The apparatus of claim 8, wherein the memory unit is further configured for storing said information associated with the electronic certificate, and the display application is further configured for displaying information on the display screen by:
- identifying a location of said vehicle utilizing global positioning signal data; and
- displaying said information associated with the digital certificate on the display screen based, at least in part, on said location of said vehicle.

11. The apparatus of claim 8, wherein the control module further includes display functions, each of said display functions being configured for displaying information on the display screen.

12. A system for automatically displaying electronic documents on a vehicle, comprising:
- a display screen embedded in a window of the vehicle in a manner visible from outside the vehicle, wherein the display screen comprises at least one button, manipulable by a user outside of said vehicle, to select a display mode of said display screen;
- a control module configured for displaying information on the display screen; and
- an I/O port configured for transferring an encrypted digital certificate to the control module, wherein the encrypted digital certificate is for a vehicle plate number for the vehicle and for the display screen;

wherein the control module is coupled to the display screen;

the control module including:
- a memory module configured for storing the digital certificate; and
- a display function configured for automatically displaying information on the display screen by:
  - retrieving the digital certificate from the memory unit of the control module; and
  - upon validating the digital certificate in the control module, displaying information associated with the digital certificate on the display screen, wherein the information includes an electronic document that indicates at least one of compliance with a local law, valid insurance, validation of payment of taxes associated with the vehicle, and a parking receipt for parking the vehicle.

13. The system of claim 12, wherein the control module further includes a validation function configured for validating the digital certificate.

14. The system of claim 12, wherein the memory unit is further configured for storing said information associated with the electronic certificate, and the display application is further configured for displaying information on the display screen by:
- identifying a location of said vehicle utilizing global positioning signal data; and
- displaying said information associated with the digital certificate on the display screen based, at least in part, on said location of said vehicle.

15. The system of claim 12, wherein the control module further includes display functions, and each of said display functions is configured for displaying information on the display screen.

16. The system of claim 12, wherein the I/O port comprises a wireless communication module, and the control module further includes a client module for wirelessly receiving the electronic certificate from a server.

17. The system of claim 12, wherein the control module is configured for receiving the electronic certificate from input media coupled to the I/O port.

18. The system of claim 12, wherein the control module and display screen are configured for use in only a particular vehicle.

* * * * *